Feb. 7, 1939.  H. HUEBER  2,146,216
MOTOR VEHICLE HEATER
Filed Oct. 11, 1932  2 Sheets-Sheet 2
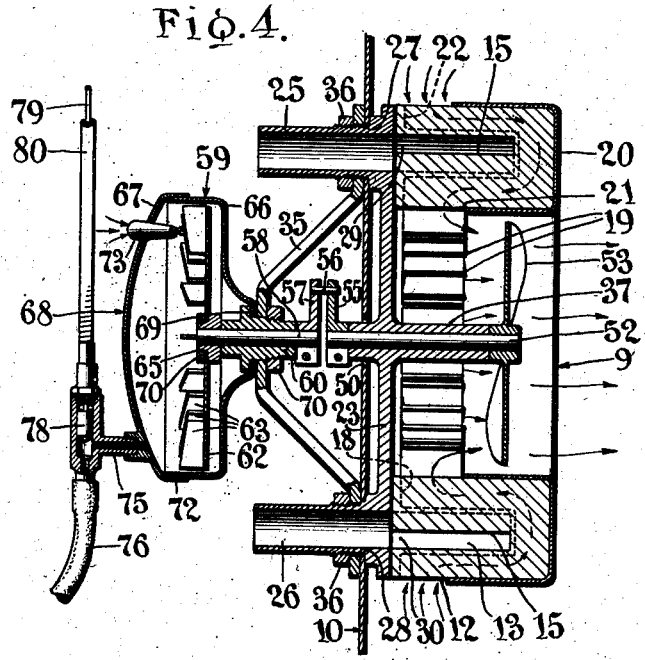
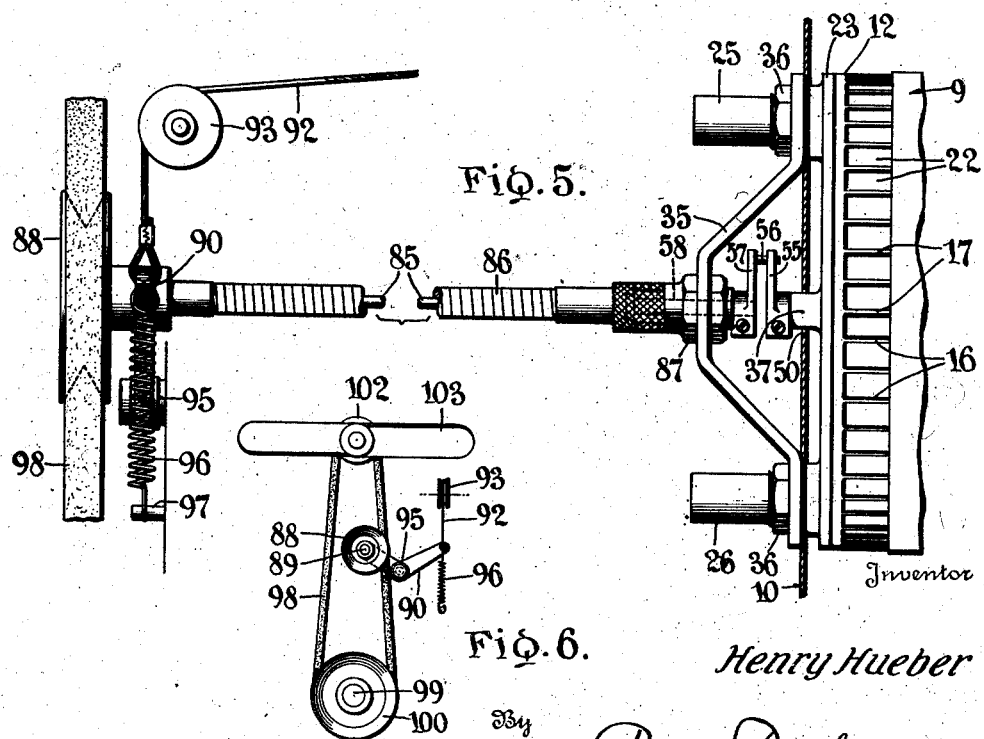
Inventor
Henry Hueber
By
Bean & Brooks, Attorneys Patented Feb. 7, 1939

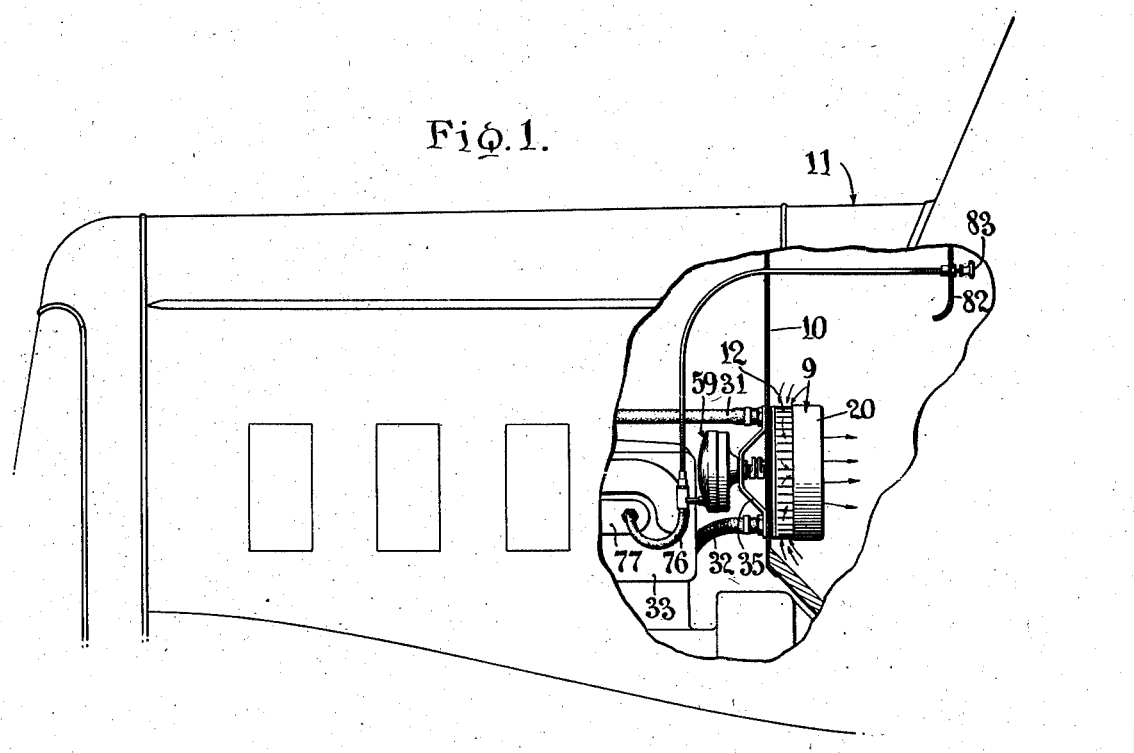
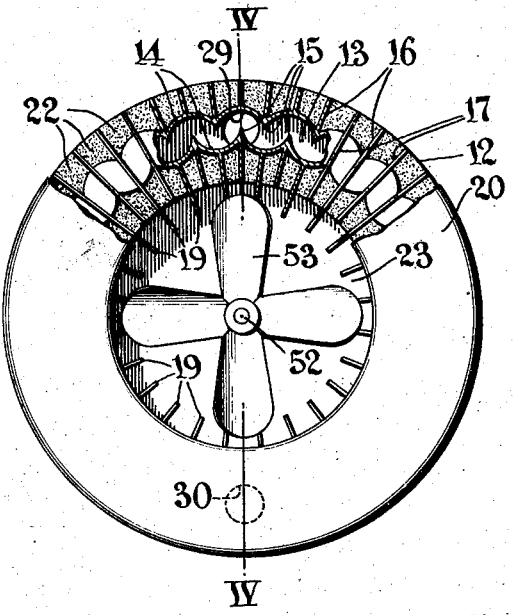
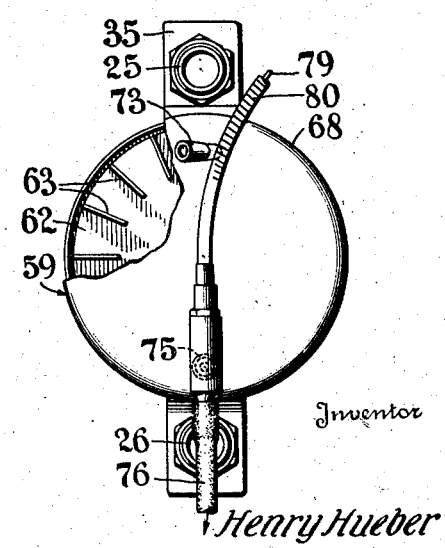

2,146,216

UNITED STATES PATENT OFFICE 2,146,216

MOTOR VEHICLE HEATER

Henry Hueber, Buffalo, N. Y., assignor to Trico Products Corporation, Buffalo, N. Y.

Application October 11, 1932, Serial No. 637,307

4 Claims. (Cl. 257—137)

This invention relates to heaters for motor vehicles and it has particular relation to the mounting and arrangement of a type of heater adapted to be supplied with power for air circulating and heating fluid directly from existing elements of a conventional motor vehicle.

One object of the invention is to provide a heater adapted to receive its heating medium directly from a motor vehicle radiator or from the exhaust conduits, and provided with a suction operated turbine driven by power generated by the suction in an intake manifold of an internal combustion engine of the vehicle.

Another object of the invention is to provide a heater having its heating fluid supplied either in gaseous form from the exhaust conduits or in liquid form from the engine water cooling system of an automobile and including operative connections to the vehicle fan belt for driving a device for circulating air through the heater and in a compartment of the automobile to be heated.

Another object of the invention is to provide a heater including an improved construction particularly adapted to radiate heat from heated fluid passing from an automobile engine through the heater.

In the drawings:

Fig. 1 is a fragmentary elevation of a front portion of the motor vehicle having a heater shown in side elevation therein;

Fig. 2 is a partial elevation on a larger scale, of a heater element with portions broken away and shown in cross section;

Fig. 3 is a front elevation of a fluid turbine for operating an air circulator and having a portion broken away for the sake of clearness;

Fig. 4 is a cross section taken substantially along the line IV—IV of Fig. 2;

Fig. 5 is a fragmentary elevation of another form of the invention; and

Fig. 6 is a diagrammatic front elevation of the fan and fan belt mounting employed for driving the device shown in Fig. 5.

Referring to Figs. 1 to 4, a heater 9 is mounted upon a dash 10 of a motor vehicle 11, and comprises a heat transfer unit in the form of a casting 12 provided with an annular chamber 13 having opposed curved arcuate wall portions 14 which form staggered or alternately arranged pointed crests 15 extending inwardly of the chamber. These crests serve as baffles to agitate the flow of fluid through the chamber and to direct such fluid in an irregular path. Two sets of rigid fins 16 and 17 are formed integrally and circumferentially of the chamber walls of the casting and surround three sides thereof. The front side of the heat transfer unit adjacent the dash is closed by an integral radial annular wall 18 extending from the chamber walls outwardly to the radial extremities of the fins. It will be observed from Figs. 2 and 4 that the fins 16 are provided with radially inwardly offset extensions 19 and that all of the fins extend axially in uniform relation about the rear portion of the chamber 13. The entire casting including the fins and wall 18 is unitary and is made in one casting operation. It is to be understood that the terms front and rear are mentioned with reference to the front and rear of the motor vehicle.

An annular channel-like shield 20 receives the axially projecting portions of the fins 16 and 17 fitted closely therein and the inner shield flange 21 abuts the edges of the radial extensions 19 of the fins 16. This shield is secured in the position shown by springing its flanges over the fins 17 or by soldering it to the fins. Thus it can be removable if desired. This arrangement provides passageways 22 opening from the peripheral portions of the casting about the fins and extending about the walls of the chamber inside the channel shield 20 through the central portion of the transfer unit 12.

A plate 23 of disc-like form rigidly secured to the front wall 18 of the casting covers the chamber 13 at the front side thereof and is provided with a pair of nozzles 25 and 26 which project through openings 27 and 28, respectively, in the dash 10. Ports 29 and 30 in the nozzles are thus formed for direct communication with diametrically opposite portions of the chamber 13. A pair of conduits 31 and 32 are connected to a source of fluid which is in the form of liquid supplied from the water circulation system of the motor vehicle engine 33 or in the form of air from the exhaust manifold. Heating medium utilized from either of these sources is known and hence specific description of the manner in which heated fluid is directed through the conduits 31 and 32 is not necessary.

An angular bracket 35 has its opposite end portions fitting over the nozzles, and nuts 36 are threaded upon the nozzles to clamp the plate firmly upon one side of the dash 10, as well as to clamp the plate 23 against the opposite side of the dash. The bracket 35 extends outwardly from the dash and its intermediate portion is spaced from the dash on the side opposite the plate 23. At the central portion of the plate 23 a tubular bearing 37 has one of its ends extending axially and integrally of the plate to a position substantially centrally of the annular shield 20, and its other end extending through an opening 50 in the dash. A shaft 52 is journalled in the bearing 37 and rigidly supports a blower, shown in the form of a fan 53, centrally of the shield 20 adjacent the inwardly projecting portions 19 of the fins 16. A coupling member 55 is secured to the end of the shaft 52 opposite the fan and is connected by means of a pin 56 to a similar coupling member 57 which is secured to a shaft 58 of a fluid turbine 59 that is supported by a bearing 60 carried by the central portion of the angular bracket 35. A turbine rotor 62 including blades 63 is rigidly mounted upon the end of the shaft 58 by means of a suitable connection 65 that abuts the bearing 60.

Complemental housing sections 66 and 67 providing a casing 68 of the turbine, enclose the rotor 62 and the central portion of the housing section 66 is clamped between a shoulder 69 of the bearing and the bracket 35 by means of a nut 70 threaded upon the bearing on the side of the bracket opposite the shoulder 69. The sections 66 and 67 are partially telescoped, as indicated at 72, and secured together by any suitable means. A nozzle 73 secured through the wall of the section 67 and extending toward the adjacent blade of the rotor 62 is provided for directing a jet of fluid against the blades 63. Another portion of the housing section 67 has a tubular fluid connection 75 to a suction tube 76 that is in communication with the intake manifold 77 of an internal combustion engine 33 of the vehicle. A valve 78 connected to a flexible rod 79 that is enclosed in a flexible tube 80 extends through the dash and through an instrument board 82 of the vehicle where it is provided with a manually operable knob 83 for controlling the flow of fluid through the fluid connection 75.

By placing the casing 68 in communication with the intake manifold and thereby exhausting the air therefrom additional air under atmospheric pressure impinges upon the blades 63 through the nozzle 73 and operates the turbine which in turn drives the fan 53. Thus air is circulated by the fan through the passageways 22 around the chamber 13 for heating the interior passenger compartment of the vehicle.

In the form of the invention shown in Figs. 5 and 6, a heater 9 is constructed and arranged in the same manner as the heater 9 shown in the other figures, and hence, the same reference characters are employed to designate the corresponding parts. However, the shaft 58 instead of being connected to a turbine is connected to a flexible shafting 85 that is enclosed in a flexible tube 86 and is mounted in a bearing 87 carried by the bracket 35 of the heater. The end of the flexible shaft 85 rigidly supports a pulley 88 that has a journal connection 89 to one end of a lever 90 and the other end of the lever is connected to a flexible member 92, such as a cable, that is trained about a pulley 93 carried by the vehicle. This cable is accessible to the vehicle operator in substantially the same manner as the knob 83. An intermediate portion of the lever has a pivotal connection 95 to the vehicle. One end of a spring 96 is connected to the end of the lever to which the flexible member 92 is connected and extends in a direction opposite the latter for connection to a pin 97 carried by the vehicle. The spring is normally under tension and tends to swing the pulley 88 into engagement with a fan belt 98 of the vehicle engine. Thus the fan belt is operated by the engine crank shaft 99 that carries a pulley 100 for transmission of power through the belt to a pulley 102 of the engine fan 103. By manipulating the flexible member 92 against the action of the spring 96 and adjusting it, the pulley is disengaged from the fan belt. Conversely, by releasing the flexible member or relieving the tension thereon, the spring 96 holds the pulley 88 in contact with the fan belt and hence the air circulating fan 53 is operated through the flexible shafting 85.

Although only the preferred forms of the invention have been shown and described in detail, it will be apparent to those skilled in the art that the invention is not so limited but that various changes may be made therein without departing from the spirit of the invention or from the scope of the appended claims.

What is claimed is:

1. In a heating device, a heat transfer unit formed with a fluid circulation chamber therein, fluid circulating conduits connected to the transfer unit for supplying heating fluid, a series of heat radiating fins extending integrally from the walls of the circulation chamber, a plurality of said fins having inwardly offset portions, and a channel-like shield fitting over portions of the fins and having one of its edges abutting the offset fin portions.

2. In a heating device, a heat transfer unit formed with a fluid circulation chamber therein, the inner walls of said chamber having arcuate inwardly directed portions forming crests for agitating the flow of fluid through the chamber, fluid circulating conduits connected to the transfer unit, a series of heat radiating fins extending integrally from the walls of the circulating chamber, and a channel-like shield fitting over the fins to form passageways therewith about the chamber.

3. In a heating device, a one piece hollow casting of substantially ring-like form and having front and rear sides, a series of heat radiating fins extending integrally from a major portion of the casting surface, a radial wall defining the front face of the casting, means for supporting the casting along said radial wall, a plurality of the fins having extensions radially inwardly beyond the others, and a shield fitted over a portion of the fins and abutted against the fin extensions to form passageways with the fins, said passageways opening inwardly and outwardly in radial directions from the body of the casting.

4. In a heating device for a motor vehicle, a heat transfer unit formed with a fluid circulation chamber therein, a wall support carrying said unit on one side thereof, said transfer unit having nozzles thereon extending through the wall, fluid circulating conduits for circulating heated fluid through the nozzles and in the transfer unit, a bracket formed with an outwardly offset intermediate portion mounted in opposed relation to the heat transfer unit on the opposite side of the wall, means for clamping the bracket and transfer unit toward each other against the wall, said transfer unit including a bearing extending through the central portion thereof and through the wall, a second bearing mounted in the bracket in alignment with the first mentioned bearing, a pair of shafts mounted in the bearings and having a coupling connecting them between the bearings, an air circulating fan mounted upon one of the shafts, and means mounted upon said second bearing for operating the shaft and fan.

HENRY HUEBER.